June 2, 1959     A. SENKOWSKI ET AL     2,888,998
TRACTOR WITH POWER TAKE-OFF FOR AUXILIARY PUMP
Filed May 14, 1953     3 Sheets-Sheet 1

INVENTORS.
ALEXANDER SENKOWSKI &
ARTHUR EDWARD LYNES
BY
Carlsen, Pitzner, Hubbard & Wolfe
ATTORNEYS.

INVENTORS.
ALEXANDER SENKOWSKI &
ARTHUR EDWARD LYNES
BY
ATTORNEYS.

INVENTORS.
ALEXANDER SENKOWSKI &
ARTHUR EDWARD LYNES
ATTORNEYS.

United States Patent Office 2,888,998
Patented June 2, 1959

2,888,998

TRACTOR WITH POWER TAKE-OFF FOR AUXILIARY PUMP

Alexander Senkowski, Earlsdon, Coventry, and Arthur E. Lynes, Coventry, England, assignors to Massey-Harris-Ferguson (Sales) Limited, a British company Application May 14, 1953, Serial No. 354,904

Claims priority, application Great Britain May 16, 1952

3 Claims. (Cl. 180—53)

The invention relates to tractors and more particularly to tractors of the general purpose type having a trailing implement hitch linkage together with a power unit and associated controls for automatically maintaining an attached implement at a selected constant working depth and for swinging it between working and transport positions. A tractor equipped with such a linkage and power unit is disclosed in the Ferguson Patent No. 2,118,180 issued May 24, 1938.

One object of the invention is to provide power transmitting mechanism in which the various components, such as the change-speed transmission, final drive mechanism and hydraulic power unit, are constructed and interrelated to form a well balanced, compact structure that can be readily accommodated in the tractor body without requiring excessive width or height and which lend themselves to easy assembly within the tractor body.

Another object is to provide an improved change-speed transmission which has a speed range particularly adapted for the increased power of the tractor and which, by reason of its compact balanced construction, is easily correlated with the final drive mechanism, the hydraulic power unit and other elements of the tractor.

It is also an object of the invention to provide an improved arrangement for selectively driving the pump of the power unit and the power take-off shaft of the tractor.

Other objects and advantages of the invention will become apparent from the following detailed description of the preferred embodiment illustrated in the accompanying drawings in which.

Figure 1:
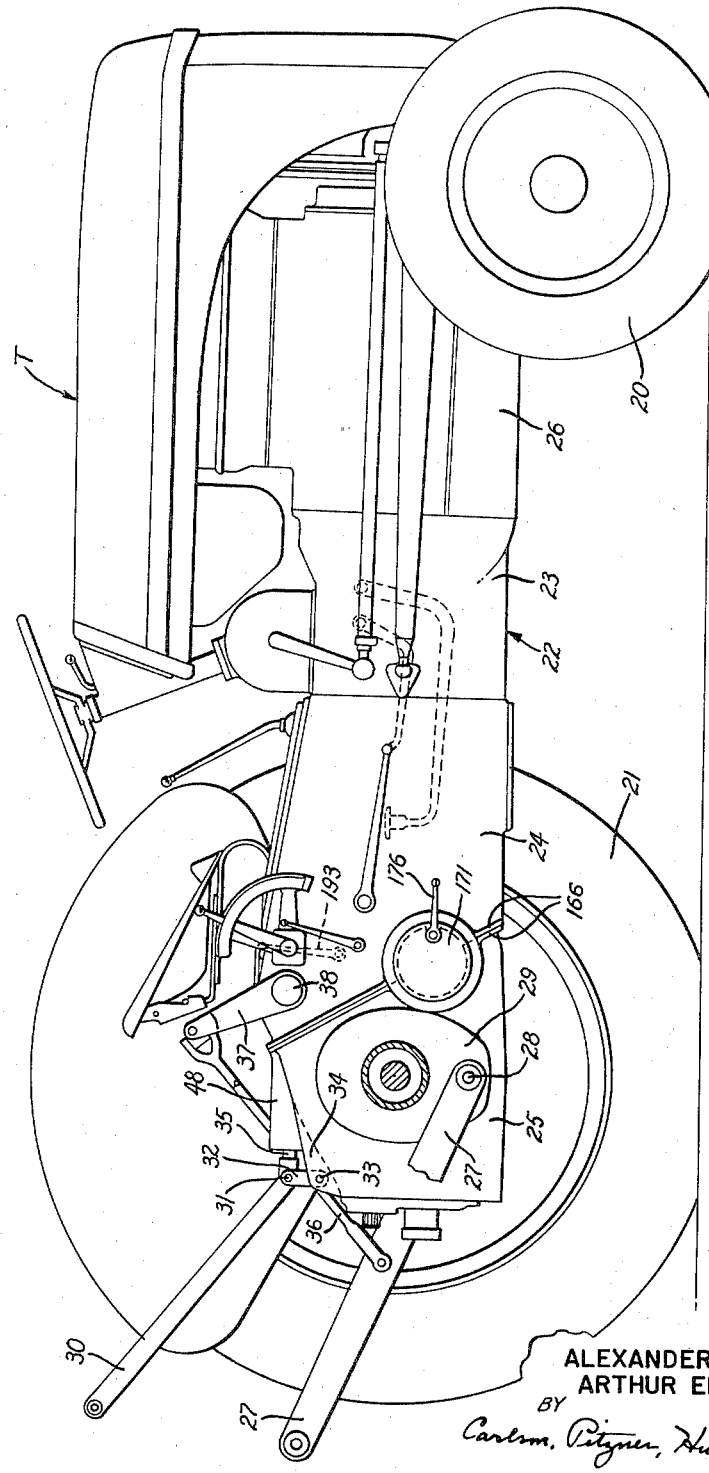
Figure 1 is a side elevational view of a tractor embodying the features of the invention.

While the invention has been shown and will be described herein as embodied in a particular tractor, it is to be understood that this is merely exemplary and that the invention is not limited to the specific environment in which it has been illustrated. It is also to be understood that various changes, modifications and adaptations may be made in the form, construction and arrangement of the various elements involved without departing from the spirit and scope of the invention as expressed in the appended claims.

*The tractor*

For purposes of illustration, the invention has been shown as incorporated in a frameless type four-wheeled tractor T having an elongated body supported at its front end by wheels 20 arranged for steering and at its rear end by driving or traction wheels 21. The tractor body in its preferred form comprises a housing 22 constructed, in this instance, in three sections including a front section or clutch casing 23, an intermediate section or transmission casing 24 and a rear section or differential casing 25. The three housing sections are bolted or otherwise rigidly secured together in end-to-end relation and the front section of the assembly is bolted to the engine casing 26 to form therewith a rigid structure constituting the backbone of the tractor.

For attaching implements, the exemplary tractor is equipped with a three-element hitch linkage of the general type disclosed in the aforementioned Ferguson patent. Briefly, the hitch linkage comprises a pair of lower draft links 27 universally pivoted at their forward ends as at 28 on axle housings 29 rigid with and projecting at opposite sides of the rear housing section 25. The pivot 28 in this instance is located below the central axes of the axle housings and may be either directly below or slightly forward of such axes. The third link of the hitch linkage comprises a top or control link 30 universally pivoted as at 31 to a rocker member 32 which in turn is pivoted as at 33 upon a pair of upstanding lugs 34 formed on the upper rear portion of the housing section 25. The rocker 34 is pivotally connected to a spring biased control member or plunger 35 as will appear presently.

*Hydraulic power unit*

Provision is made for raising and lowering the hitch linkage and the implement attached thereto through the medium of a hydraulic power unit enclosed in the tractor body. To this end, the draft links are supported by drop links 36 from crank arms 37 fixed to opposite ends of a rockshaft 38 journaled in the upper end of the tractor body, in this instance the housing section 24. Rocking of the shaft 38 is effected by a ram forming a part of the hydraulic power unit above referred to and comprising a rearwardly opening cylinder 39 having a piston 40 working therein. The piston is shaped to provide a rearwardly facing socket for the reception of one ball-shaped end of a piston rod 41 which has its other ball-shaped end engaged in a socketed arm 42 fixed on the rockshaft 38.

Figure 2:
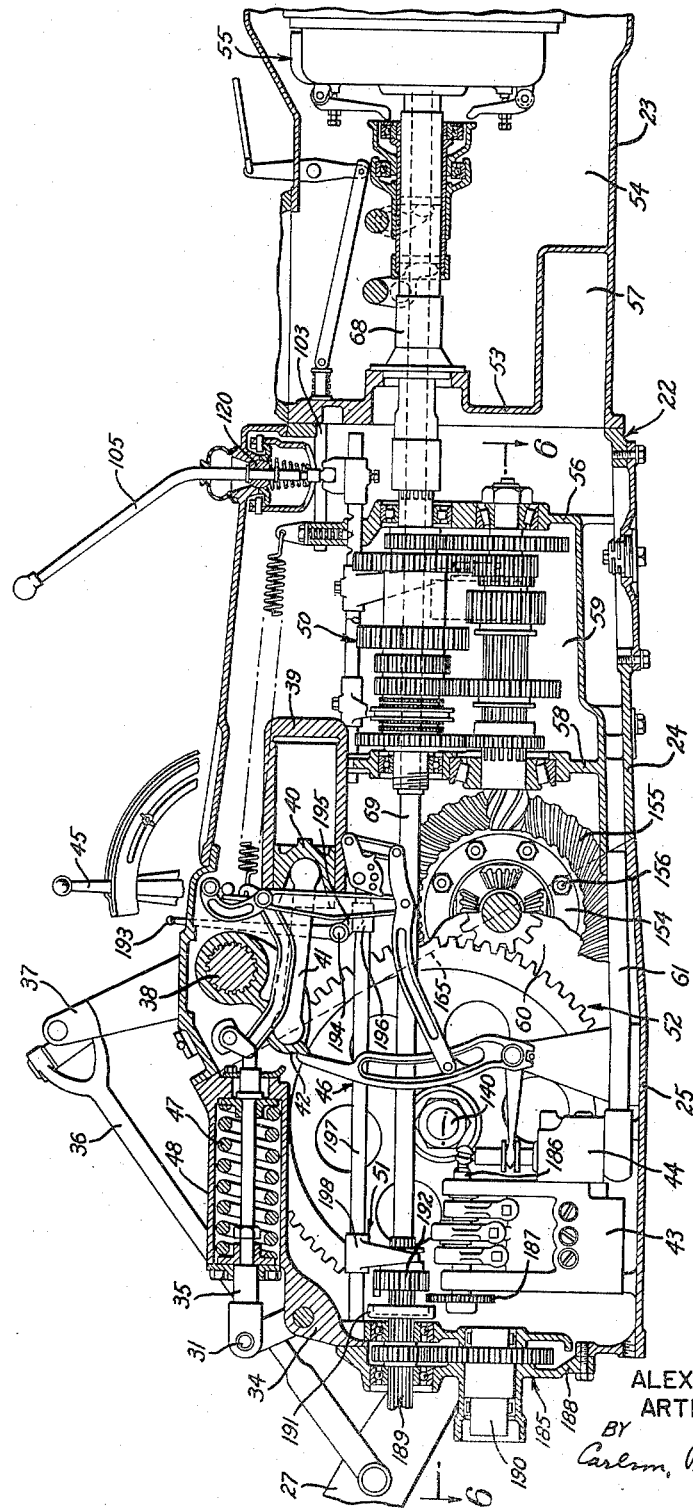
Fig. 2 is a longitudinal vertical sectional view through the body of the tractor shown in Fig. 1.

Pressure fluid for operating the ram is supplied by a pump 43 under control of valve mechanism 44. The pump 43, which is driven from the tractor engine, as will be described hereinafter, may be of any suitable type. The particular pump illustrated is a piston-type pump with the valve mechanism assembled in a unitary structure therewith as disclosed in the co-pending application of Alexander Senkowski and Frederick D. Cooper, Serial No. 354,905, filed May 4, 1953, now Patent No. 2,816,515. Operation of the valve mechanism to regulate the supply of pressure fluid to and exhaust of fluid from the ram cylinder 39 is effected jointly by a manually operable quadrant lever 45 and the control plunger 35 acting through a linkage 46. The construction and operation of the control system shown is described in detail in the co-pending application of Alexander Senkowski and Frederick D. Cooper, Serial No. 386,822, filed October 15, 1953, now Patent No. 2,786,402. As shown in Fig. 2, the biasing spring for the control plunger 35 comprises a double acting coiled compression spring 47 enclosed in a casing 48 which may be conveniently formed as an integral part of the housing section 25.

*General Organization of the tractor*

It is contemplated that the exemplary tractor will be equipped with a substantially larger engine, that is, an engine of from fifty to one hundred percent greater horsepower than engines provided in tractors of this general type as heretofore produced commercially. The greater power, of course, is to adapt the tractor for use with larger implements and in general for handling heavier jobs. The present invention provides power transmission mechanism adapted for this greater power including a change-speed transmission 50, power take-off and pump drive 51 and final drive 52 for the traction wheels of the tractor. The above-mentioned components of the mechanism are especially designed so that they can work together efficiently and, along with the hydraulic power unit and controls, find ready accommodation in a tractor body of a shape and size most suitable for the tractor. In other words, the novel construction and relationship of components of the power transmission mechanism permit the tractor body to be held within reasonable dimensional limits as to width, height, and length. Furthermore, it materially simplifies the manufacture and facilitates the assembly of the same.

The housing 22, as mentioned heretofore, is constructed in three sections 23, 24 and 25, each preferably in the form of a hollow casting. Certain of the sections, in this instance the front and intermediate sections, are formed with integral transverse partitions dividing the interior of the housing into compartments for the accommodation of the components of the power transmitting mechanism. Preferably, the construction of the housing sections and their partitions is similar to that disclosed in the co-pending application of Alexander Senkowski and Frederick D. Cooper, Serial No. 354,906, filed May 14, 1953, now Patent No. 2,775,308.

As herein shown, the front section 23 has a partition 53 defining a dry compartment 54 for the main clutch mechanism 55 of the tractor. The intermediate housing section 24 has a forward partition 56 cooperating with the partition 53 to define an oil reservoir or sump 57 for the oil employed by the hydraulic power unit. The partition 56 also cooperates with a rear partition 58 to define a compartment 59 for the change-speed transmission 50. It will be observed that the partitions 53 and 56 are shaped so that the sump 57 partially underlies the clutch compartment 54 and completely underlies the transmission compartment 59. Rear partition 58 of the intermediate housing section also constitutes the forward wall of a compartment 60 accommodating the hydraulic power unit and associated controls, the power take-off drive 51, and the final drive 52 for the tractor wheels. A conduit 61 connects the pump 43 with the sump 57.

Change-speed transmission

Figure 3:
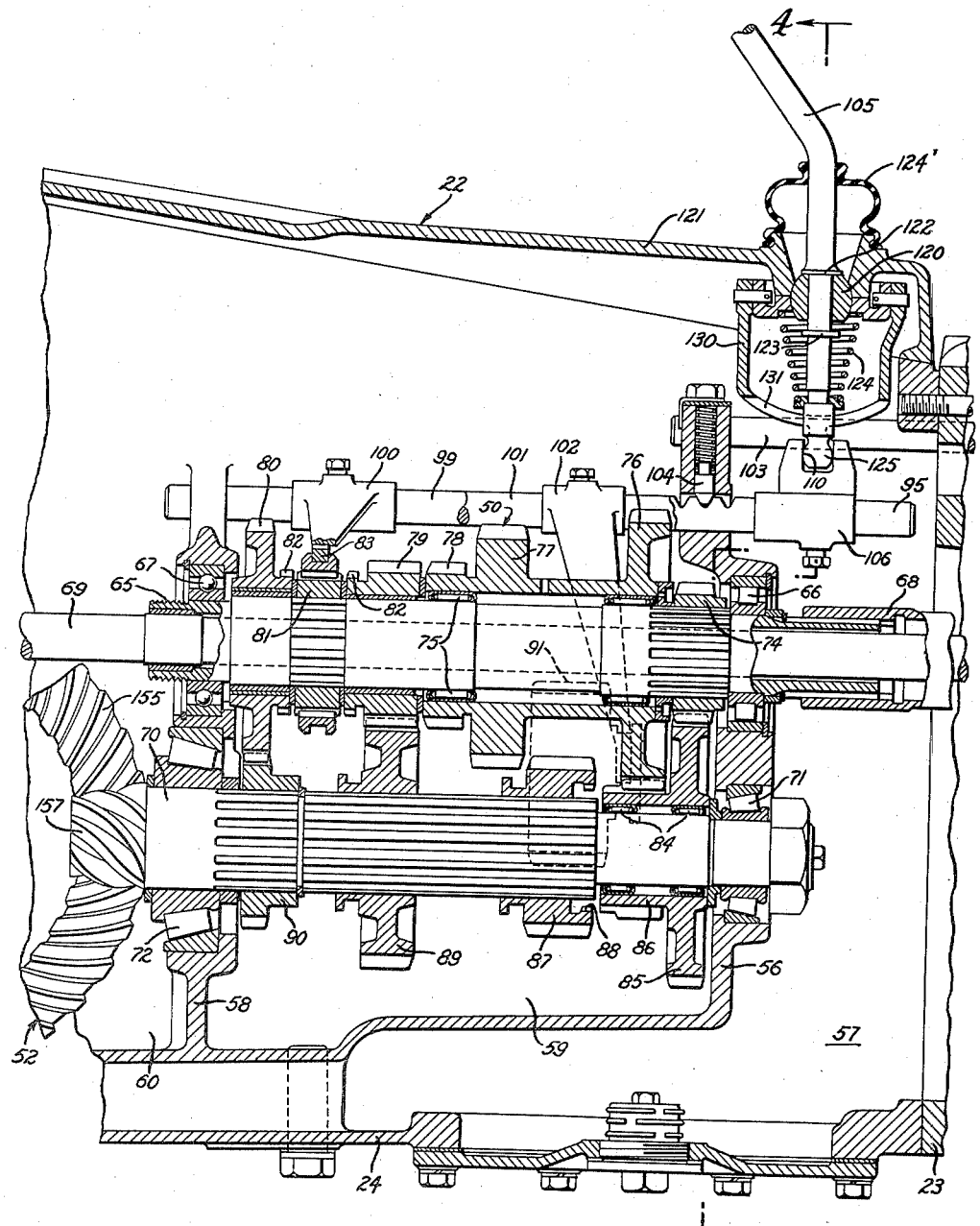
Fig. 3 is a somewhat enlarged fragmentary sectional view through the body of the tractor showing details of the change-speed transmission.

The change-speed gearing or transmission 50, as shown in Fig. 3 of the drawings, provides five forward and one reverse speed and is characterized by its compactness in a fore-and-aft direction and further by the relatively large gear reduction obtained with gears of comparatively small diameter. The transmission has a tubular input shaft 65 journaled at opposite ends in anti-friction bearings 66 and 67 respectively seated in recesses in the partitions 53 and 58 of the housing section 24. The shaft 65, as shown, is supported in axial alinement with the engine crankshaft and is adapted to be disengageably connected therewith through the medium of a tubular drive shaft 68 and one element of the clutch mechanism 55 which may be a dual clutch of the type disclosed in the co-pending application of Alexander Senkowski and Arthur E. Lynes, Serial No. 365,466, filed July 1, 1953. The other element of the dual clutch provides an independent disengageable driving connection for a power take-off shaft 69 extending through the two tubular shafts 65 and 68 to the rear of the tractor body.

Disposed below and parallel to the input shaft is a power delivery shaft 70 supported in this instance by anti-friction bearings 71 and 72 respectively seated in recesses in the partitions 53 and 58. A reverse drive shaft is supported at one side of and somewhat above the power delivery shaft.

The power delivery shaft 70 is driven from the input shaft 65 through selected combinations of intermeshing gears for forward drive and through such gears and a back gear on the reverse drive shaft for reverse drive. The input shaft 65 has a pinion 74 of relatively small diameter splined or otherwise non-rotatably fixed at its forward end. Next to this pinion and rotatably mounted on the shaft 65 as by needle bearings 75 is a gear cluster having three gear elements 76, 77 and 78 of progressively decreasing diameter. Adjacent the rear end of the shaft are two gears 79 and 80 separated by a toothed clutch element 81 splined to the shaft. The two gears are mounted for free rotation on the shaft 65 and each is provided with clutch teeth 82 adjacent the element 81 so that they may be drivingly coupled with the shaft by the selective shifting of an internally toothed clutch element 83 mounted on the element 81.

Rotatably supported adjacent the front end of the power delivery shaft 70 as by needle bearings 84 is a gear cluster comprising a large diameter gear element 85 in constant mesh with the pinion 74 and a small diameter gear element 86 in constant mesh with the gear element 76. Thus both gear clusters are continuously driven when the main clutch is engaged. Next to the two-gear cluster is a combined gear and clutch element 87 splined to the shaft 70 and shiftable rearwardly from the disengaged position in which it is shown in Fig. 3 to mesh with the gear 77. The element 87 is also shiftable forwardly to bring its clutch teeth 88 into positive driving engagement with the two-gear cluster on the power delivery shaft.

Two additional gears 89 and 90 are splined on the power delivery shaft and are normally in constant mesh with the gears 79 and 80 on the input shaft. The gear 89, however, is shiftable forwardly out of mesh with the gear 79 and into mesh with the gear element 78 of the three-gear cluster.

Five different forward speeds may be obtained by appropriate shifting of the gear and clutch elements above described. Thus, for the lowest speed, which may be conveniently called "extra low gear," the gear 89 is shifted forwardly to mesh with the gear 78. Power is then transmitted from the shaft 65 through the pinion 74, gears 85, 86, 76, 78 and 89 to the power delivery shaft 70. Thus, the power train comprises three pairs of intermeshing gears and it will be evident that a substantial gear reduction is obtained without requiring any especially large gears and consequently the gearing can be accommodated in a relatively small casing.

The next speed, commonly referred to as "first gear," is obtained by shifting the clutch-gear element 87 rearwardly to mesh with the gear 77. The power transmission path is then by way of pinion 74 and gears 85, 86, 76, 77 and 87 to the power delivery shaft. Here again, three pairs of intermeshing gears are involved and only small diameter gears are required to obtain a substantial gear reduction.

The next speed or "second gear" is obtained by shifting the clutch-gear 87 forwardly to positively engage with the two-gear cluster on the power delivery shaft. The power transmission train thus established includes the pinion 74, gear 85 and the clutch-gear element 87. Only one gear mesh is involved in this case which is highly advantageous as this is the speed most frequently used in the operation of the tractor.

For the next speed or "third gear" the clutch element 83 is shifted forwardly to engage the clutch teeth 82 and thus couple the gear 79 to the input shaft 65. Power is transmitted directly from the input shaft through the gears 79 and 89 to the power delivery shaft. It will be noted that the gear 89 also serves to establish the "extra low gear" drive and this double use, of course, results in economy in manufacture.

For the highest speed or "fourth gear" the clutch element 83 is shifted rearwardly to establish a driving train through gears 80 and 90 to the power delivery shaft. With the particular gear ratios illustrated, this in effect provides an overdrive enabling the tractor to be driven at a relatively high speed without speeding up the engine excessively.

Reverse drive is obtained through the medium of a gear 91 on the reverse shaft 73 in constant mesh with the gear 87 and shiftable to mesh also with the gear 77. It will be understood, of course, that the gear 91 is dimensioned so as to maintain meshing engagement with the gear 87 in the shifted position. Thus the power train for reverse is the same as that for "first gear" above, except that the gear 91 is interposed between the gears 87 and 77 as a reversing idler.

It will be evident from the foregoing that the gear arrangement above described provides a substantial number of speed ranges, five in the present instance, and that a substantial speed reduction is obtained without the use of large gears. The transmission is extremely compact and requires only two major shafts. The compactness is advantageous in permitting superimposition of the ram cylinder 39 above the transmission and close coupling with the tractor differential without requiring any excessive enlargement of the housing section accommodating the speed selecting portion of the power transmitting mechanism.

Gear selector

The invention provides simple, compact mechanism for shifting the gear and clutch elements of the change-speed transmission to establish the different driving speeds afforded by the transmission. Provision is made in this mechanism for utilizing the shift lever to actuate the engine starting switch and novel guard and interlocking means incorporated in the mechanism materially assists the operator in selecting the element to be shifted while positively locking out the non-selected elements against accidental shifting.

Referring to Fig. 3 of the drawings, the selector mechanism in its preferred form comprises a plurality of longitudinally slidable shift rods, one for each shiftable element of the transmission, and a shifter fork connecting each rod with the associated element. Thus, one shift rod 95 carries a fork cooperating with the gear element 89. A second rod (not shown) carries a fork cooperating with the clutch-gear element 87. A third rod 99 carries a fork 100 cooperating with the clutch element 83. A fourth rod 101 carries a fork 102 cooperating with the reverse gear 91. The shift rods, as shown, are disposed in a common horizontal plane adjacent the top of the transmission and are supported for endwise sliding movement in apertures in the upper end portions of the housing partitions 56 and 58. A fifth shift rod 103 slidably supported in the partitions 56 and 53 is provided for actuating the engine starting switch (not shown). Each shift rod has associated with it a spring-pressed detent, such as the detent 104 illustrated, arranged to cooperate with a series of notches in the rod to releasably retain it in selected positions of adjustment.

To provide for selective movement of the shift rods and the gear or clutch elements with which they are associated, a manually operable shift lever 105 is supported on the housing within convenient reach of the operator of the tractor. The shift rods are respectively provided with rigid arm 106 extending generally inwardly and having their inner end portions upturned to lie in side-by-side relation crosswise of the housing and in a common plane parallel to the plane of the rods. The end portions of the shift arms are formed with transverse slots adapted to aline when the associated shift rods are in a central or neutral position. Under such conditions the slots define a continuous groove or channel disposed crosswise of the transmission assembly. Starter shift rod 103 is also provided with a rigid arm extending into proximity to the upturned end of the arm 106 and having formed therein a slot adapted to aline with the row of slots in the other arms.

In addition to its universal pivotal mounting, the shift lever 105 is supported for limited endwise movement for purposes to appear presently. Support for the lever is provided by a ball element 120 apertured to slidably receive a portion of the lever. The ball element 120 is supported for universal movement in a spherical socket formed in a boss depending from a cover plate 121 provided on the housing section 24. Flanges 122 and 123 on the lever define the limit positions of the lever with reference to the ball element, and spring means, herein shown as a helicoidal compression spring 124, urges the lever downwardly to the limit position permitted by the engagement of the flange 122 with the top of the ball element. A boot 124' of rubber or other suitable flexible material protects the ball element and associated parts of the pivot mounting from the entrance of dirt or other foreign material.

At its lower end the shift lever 104 is fitted with a flattened ball element 125 adapted to ride in the slots in the shift arms. Thus when the shift rods are all in neutral position and the slots alined to form a continuous groove, the shift lever may be swung laterally to associate the element 125 with any selected one of the shift arms. Thereafter, by swinging the shift lever forwardly or rearwardly, appropriate endwise movement is imparted to the selected arm and shift rod to shift the gear or clutch element with which it is associated.

Provision is made for positively locking all non-selected shift rods in neutral position while freeing the selected rod for movement. For this purpose, a stirrup shaped housing 130 is pivotally supported from the cover plate 121 to swing about a fore-and-aft axis coincident with the axis of the ball element 120. At its lower end the housing 130 has a slot 131 extending fore-and-aft through which the lower end of the shift lever 105 extends and in which it rides freely in the forward and rearward swinging of the lever. Lateral movements of the shift lever, however, serve to swing the housing about its pivot.

The lower portion of the housing 130 is formed with an arcuate depending flange or rib adapted to engage in the slots in the shift arms. This flange is interrupted at the slot 131 and consequently the shift arm alined with that slot by the selecting movement of the shift lever is freed for endwise movement while the remaining arms are blocked against movement through engagement of the flange in their slotted ends.

Final drive mechanism

The final drive for the traction wheels 21 of the tractor is taken through the differential 52 and gearing providing a further relatively large speed reduction to the axle shafts 140 of the respective wheels. Each axle shaft has a large diameter gear, commonly called a bull gear, splined on its inner end.

The bull gears are differentially driven from the differential 52 which, in the present instance, is extremely simple in design and which incorporates novel features of construction that give it a high degree of shock strength and make it particularly suitable for the rigorous usage to which such mechanisms are subjected in the operation of a tractor. The novel construction also facilitates assembly of the differential with the other elements of the tractor.

Referring to the drawings, the differential 52 in its preferred form comprises a heavy cross shaft which forms the sole support for the other elements of the differential and which, in turn, is supported in tapered roller bearings carried on the side walls of the tractor housing. Projecting radially from the central portion of the shaft are a plurality of arms or trunnions each rotatably supporting a differential pinion or planet gear. The outer ends of the trunnions are seated in recesses in a split ring or spider 154 to which a ring gear 155 is secured as by bolts 156, the bolts additionally serving to secure the two halves of the spider together.

While any desired number of the trunnions may be provided, it is preferred to employ four, as shown in Fig. 2, in view of the relatively great amount of power that must be transmitted by the differential to the axle shafts 140 in this particular environment.

The ring gear 155, herein shown as a spiral bevel gear, constitutes the input gear of the differential and is driven by a bevel pinion 157 formed integrally with or non-rotatably fixed on the rear end of the transmission power delivery shaft 70. A pressure pad bearing against the outer face of the gear 155 in opposed relation to the pinion 157 assists the gear in resisting lateral thrust from the pinion. As the ring gear 155 is rigidly mounted on the spider 154, its rotation serves to turn the spider, the trunnions and the cross shaft as a unit about the axis of the latter.

To facilitate assembly of the differential 52 with the other elements of the tractor, the housing sections 24 and 25 of the tractor body are formed to join along a plane intersecting the axis of the differential shaft, as indicated by the broken line 165 in Fig. 2. The sections are preferably formed with mating flanges 166 by which they may be rigidly secured together by bolts or other suitable fastening elements, as shown in Fig. 1. Preferably, the meeting plane between the housing sections is disposed obliquely to the longitudinal axis of the tractor to proportion the space between the two sections for efficient accommodation of the parts to be enclosed therein. Thus, the section 24 accommodates the lift shaft 38, ram cylinder 39 and a portion of the differential, while section 25 accommodates the axle shafts and their bull gears, the pump 43 and the power take-off mechanism. The various elements may therefore be assembled in their respective sections prior to the joining of the housing sections together.

*Power take-off and pump drive*

As explained heretofore, the improved power transmission mechanism of the invention provides a shaft 69 driven independently of the speed change transmission 50 and consequently capable of being continuously driven even when the main clutch is disengaged for shifting gears. This shaft is utilized in the present instance for driving an external power take-off unit 185 mounted on the rear end of the tractor and also the pump 43 mounted within the rear housing section 25. As will be seen by reference to Fig. 2 of the drawings, the pump has its drive shaft 186 disposed below and parallel to the shaft 69 and provided with a driving gear 187.

The power take-off unit 185 may be of any preferred construction. Briefly, it includes a cover plate 188 adapted to be removably secured over an opening in the rear portion of the housing section 25 and constituting a part of a supporting structure rotatably supporting high and low speed power take-off elements 189 and 190 accessible from the exterior of the tractor for coupling with implements or other parts to be driven. The power take-off element 189 is in the form of a shaft having at its inner end an internally toothed enlargement 191 constituting one element of a clutch.

Provision is made for selectively connecting the shaft 69 with the pump 43 alone, with the pump and power take-off element 189 simultaneously, or for disconnecting both drives. For this purpose the shaft has a gear 192 non-rotatably and axially slidable thereon from the disengaged or retracted position in which it is shown in Fig. 2 to a first operated position in which it is drivingly engaged with the pump gear 187. The gear 192 is further shiftable to a second operated position in which it retains its driving engagement with the pump gear and additionally engages the clutch element 191 to complete a driving connection with the power take-off element.

Manually operable means including a hand lever 193 is provided for shifting the gear 192 between its three positions above mentioned. As herein shown, the hand lever is mounted on the outer end of a cross shaft 194 journaled in the housing section 24. At its inner end within the housing the shaft 194 has a rigid crank arm 195 operatively engaging a yoke 196 on a shift rod 197 extending to the rear of the tractor body and supported therein for endwise sliding movement. The shift rod carries a shifter fork 198 operatively engaging the hub of the gear 192 and effective to shift it along the shaft 69 when the hand lever 193 is rocked.

In general, it will be evident that the invention provides for the construction and interrelation of the components of the tractor in a novel manner which adapt them for use with a higher powered engine than has been practicable heretofore in general purpose tractors equipped with power implement lifts. By simplifying construction, manufacturing costs are reduced and the ruggedness and dependability of the tractor is materially increased.

We claim as our invention:

1. In a tractor having a change-speed transmission interposed between the engine and the rear traction wheels, a shaft extending to the rear of the tractor and driven from the engine independently of the transmission, and a rear power take-off shaft axially alined with the independently driven shaft and having an internally toothed gear element on the end adjacent the driven shaft, the combination of a pump supported in the body of the tractor and having a driving gear disposed adjacent the clutch element on the power take-off shaft, a toothed gear non-rotatable and axially slidable on the driven shaft, said gear being shiftable from a disengaged position progressively to a first position to mesh with the pump driving gear and then to a second position to positively engage the gear element on the power take-off shaft, said shiftable gear being dimensioned to maintain its engagement with the pump driving gear in said second position.

2. In a tractor having a change-speed transmission interposed between the engine and the rear traction wheels, a shaft extending to the rear of the tractor and driven from the engine independently of the transmission, a gear non-rotatable and axially slidable on said driven shaft, and a rear power take-off shaft axially alined with the independently driven shaft and having a toothed driving element on the end adjacent the driven shaft, the combination of a pump supported in the body of the tractor and having a driving gear disposed adjacent the toothed driving element on the power take-off shaft, said gear on the driven shaft being shiftable from a disengaged position progressively to a first position to mesh with the pump driving gear and then to a second position to mesh with the toothed element on the power take-off shaft and being dimensioned to maintain its engagement with the pump driving gear in said second position.

3. In a tractor having a change-speed transmission interposed between the engine and the rear traction wheels, a rear power take-off shaft, and a shaft extending to the rear of the tractor and driven from the engine independently of the transmission, the combination of a pump supported in the body of the tractor in proximity to the power take-off shaft, a clutch element on the independently driven shaft shiftable from a disengaged position progressively into two engaged positions, said clutch element being operative in one engaged position to establish a driving connection between the shaft and said pump and in the second engaged position to establish a driving connection from said shaft to both said pump and the power take-off shaft, and means for shifting said clutch element.

References Cited in the file of this patent

UNITED STATES PATENTS

| | | |
|---|---|---|
| 1,205,982 | Eason | Nov. 28, 1916 |
| 1,417,192 | Mason | May 23, 1922 |
| 1,858,533 | White | May 17, 1932 |
| 1,878,379 | Church | Sept. 30, 1932 |
| 1,909,889 | Peterson | May 16, 1933 |
| 1,956,253 | Schroenrock | Apr. 24, 1934 |
| 2,056,881 | Alden | Oct. 6, 1936 |

(Other references on following page)

UNITED STATES PATENTS

| | | |
|---|---|---|
| 2,073,613 | Frudden et al. | Mar. 16, 1937 |
| 2,241,764 | Bollinger | May 13, 1941 |
| 2,247,668 | Rosenthal | July 1, 1941 |
| 2,302,637 | McCormick | Nov. 17, 1942 |
| 2,320,454 | Eberhard | June 1, 1943 |
| 2,416,640 | Pinardi | Feb. 25, 1947 |
| 2,506,671 | Jacobi | May 9, 1950 |
| 2,521,729 | Keese | Sept. 12, 1950 |
| 2,668,601 | Keese | Feb. 9, 1954 |
| 2,674,892 | Keese et al. | Apr. 13, 1954 |

FOREIGN PATENTS

| | | |
|---|---|---|
| 133,378 | Australia | July 14, 1949 |